United States Patent
Chauvel (10) Patent No.: US 7,500,085 B2
(45) Date of Patent: Mar. 3, 2009

(54) IDENTIFYING CODE FOR COMPILATION

(75) Inventor: Gerard Chauvel, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 445 days.

(21) Appl. No.: 11/188,504

(22) Filed: Jul. 25, 2005

(65) Prior Publication Data

US 2006/0026405 A1    Feb. 2, 2006

(30) Foreign Application Priority Data

Jul. 27, 2004    (EP)    .................... 04291918

(51) Int. Cl.
*G06F 9/30* (2006.01)
*G06F 9/40* (2006.01)
*G06F 15/00* (2006.01)

(52) U.S. Cl. .................... 712/209; 712/211
(58) Field of Classification Search ........... 712/200, 712/209, 211
See application file for complete search history.

(56) References Cited

U.S. PATENT DOCUMENTS

| | | | |
|---|---|---|---|
| 4,080,650 A | 3/1978 | Beckett | |
| 4,484,271 A | 11/1984 | Miu et al. | |
| 4,821,183 A | 4/1989 | Hauris | |
| 5,274,815 A * | 12/1993 | Trissel et al. | 712/226 |
| 5,822,578 A | 10/1998 | Frank et al. | |
| 6,298,434 B1 * | 10/2001 | Lindwer | 712/209 |
| 6,385,764 B1 * | 5/2002 | Blandy et al. | 717/127 |
| 6,591,416 B1 * | 7/2003 | Bak et al. | 717/159 |
| 6,691,308 B1 | 2/2004 | Kasper | |
| 6,785,886 B1 * | 8/2004 | Lim et al. | 718/1 |
| 6,907,515 B2 * | 6/2005 | Seal et al. | 712/209 |
| 7,003,652 B2 * | 2/2006 | Nevill et al. | 712/244 |
| 7,051,177 B2 * | 5/2006 | Le et al. | 711/167 |
| 2003/0084434 A1 | 5/2003 | Ren | |
| 2005/0071611 A1 | 3/2005 | DeWitt et al. | |

OTHER PUBLICATIONS

M. C. Merten, A. R. Trik, C. N. George, J. Gyllenhaal, and W. W. Hwu, "A hardware-driven profiling scheme for identifying program hot spots to support runtime optimization," in Proceedings of the 26th Annual International Symposium on Computer Architecture, pp. 136-147, 1999.

* cited by examiner

*Primary Examiner*—Eddie P Chan
*Assistant Examiner*—Corey S Faherty
(74) *Attorney, Agent, or Firm*—Ronald O. Neerings; Wade James Brady, III; Frederick J. Telecky, Jr.

(57) ABSTRACT

A processor comprising fetch logic adapted to fetch a set of instructions from memory, the set comprising a subset of instructions. The processor further comprises decode logic coupled to the fetch logic and adapted to process the set of instructions, and a clock coupled to the decode logic. When processed, an instruction from the set causes the clock to increment a counter external to the processor while the subset is processed. A status of the counter is manipulated to determine an efficiency level pertaining to the subset of instructions.

30 Claims, 3 Drawing Sheets

| R0 | GENERAL PURPOSE (GP) |
|---|---|
| R1 | GENERAL PURPOSE (GP) |
| R2 | GENERAL PURPOSE (GP) |
| R3 | GENERAL PURPOSE (GP) |
| R4 | GENERAL PURPOSE (GP) |
| R5 | GENERAL PURPOSE/LOCAL VARIABLE POINTER (LV) |
| R6 | STACK POINTER (SP) |
| R7 | TOP OF STACK (ToS) |
| R8 | GENERAL PURPOSE (GP) |
| R9 | GENERAL PURPOSE (GP) |
| R10 | GENERAL PURPOSE (GP) |
| R11 | GENERAL PURPOSE (GP) |
| R12 | GENERAL PURPOSE (GP) |
| R13 | GENERAL PURPOSE (GP) |
| R14 | GENERAL PURPOSE (GP) |
| R15 | STATUS AND CONTROL (ST) |

IDENTIFYING CODE FOR COMPILATION

CROSS-REFERENCE TO RELATED APPLICATIONS

This application claims priority to European Patent Application No. 04291918.3, filed on Jul. 27, 2004 and incorporated herein by reference. This application is related to co-pending and commonly assigned application Ser. No. 11/188,592 entitled "Instrumenting Software Instructions" which is incorporated by reference herein.

BACKGROUND

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and is as efficient as possible. Improvements in this area are desirable.

BRIEF SUMMARY

Disclosed herein is a method and apparatus for identifying one or more portions of a software application that may benefit from compilation and/or code optimization. An illustrative embodiment may comprise a processor comprising fetch logic adapted to fetch a set of instructions from memory, the set comprising a subset of instructions. The processor further comprises decode logic coupled to the fetch logic and adapted to process the set of instructions, and a clock coupled to the decode logic. When processed, an instruction from the set causes the clock to increment a counter external to the processor while the subset is processed. A status of the counter is manipulated to determine an efficiency level pertaining to the subset of instructions.

Another illustrative embodiment may comprise an electronic device that comprises a decode logic adapted to process a set of instructions, a clock coupled to the decode logic, and a memory coupled to the decode logic and comprising a counter. The decode logic processes an instruction that causes the clock to increment the counter with each clock pulse, the counter incremented only while the set of instructions is processed. A status of the counter is manipulated to determine an efficiency level pertaining to the set of instructions.

Still another illustrative embodiment may comprise a method that comprises causing a processor clock to increment a counter external to the processor, the counter incremented only while a first set of instructions is processed. The method also comprises, after the first set of instructions has been processed, manipulating a status of the counter to determine an efficiency level pertaining to the first set of instructions. The method further comprises comparing the efficiency level to that of a second set of instructions to determine which of the first set or the second set is to be compiled.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIG. 1 shows a diagram of a system in accordance with preferred embodiments of the invention and including a Java Stack Machine ("JSM") and a Main Processor Unit ("MPU"), in accordance with embodiments of the invention;

FIG. 2 shows a block diagram of the JSM of FIG. 1 in accordance with preferred embodiments of the invention;

FIG. 3 shows various registers used in the JSM of FIGS. 1 and 2, in accordance with embodiments of the invention;

FIG. 4 shows the preferred operation of the JSM to include "micro-sequences," in accordance with embodiments of the invention;

FIG. 5 shows a flow diagram of a method used to implement the technique described herein, in accordance with embodiments of the invention; and FIG. 6 shows an exemplary embodiment of the system described herein, in accordance with preferred embodiments of the invention.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein is a mechanism for identifying one or more portions of a software application that may benefit from compilation and/or code optimization. By compiling or otherwise optimizing these portions of code, processors are able to process the code with greater efficiency, thus saving time and power. The mechanism is a programmable electronic device such as a processor. The processor described herein is particularly suited for executing Java™ Bytecodes or comparable code. As is well known, Java is particularly suited for embedded applications. Java is a stack-based language, meaning that a processor stack is heavily used when executing various instructions (e.g., Bytecodes), which instructions generally have a size of 8 bits. Java is a relatively "dense" language meaning that on average each instruction may perform a large number of functions compared to various other instructions. The dense nature of Java is of particular benefit for portable, battery-operated devices that preferably include as little memory as possible to save space and power. The reason, however, for executing Java code is not material to this disclosure or the claims which follow. Further, the processor advantageously includes one or more features that permit the execution of the Java code to be accelerated.

Figure 1:
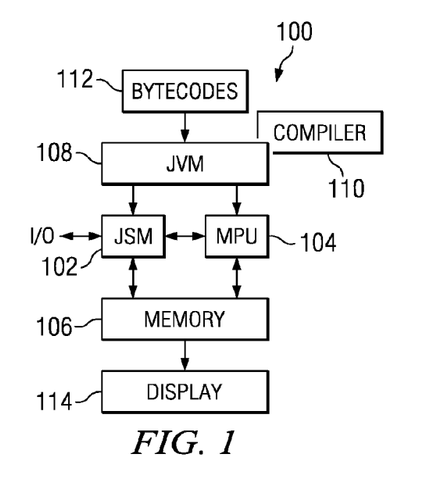

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The MPU 104 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may be included as desired for various applications.

As is generally well known, Java code comprises a plurality of "Bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") (not specifically shown) which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, Bytecode verifier, garbage collector, and a Bytecode interpreter loop to interpret the Bytecodes that are not executed on the JSM processor 102.

In accordance with preferred embodiments of the invention, the JSM 102 may execute at least two types of instruction sets. One type of instruction set may comprise standard Java Bytecodes. As is well-known, Java is a stack-based programming language in which instructions generally target a stack. For example, an integer add ("IADD") Java instruction pops two integers off the top of the stack, adds them together, and pushes the sum back on the stack. A "simple" Bytecode instruction is generally one in which the JSM 102 may perform an immediate operation either in a single cycle (e.g., an "iadd" instruction) or in several cycles (e.g., "dup2_x2"). A "complex" Bytecode instruction is one in which several memory accesses may be required to be made within the JVM data structure for various verifications (e.g., NULL pointer, array boundaries). As will be described in further detail below, one or more of the complex Bytecodes may be replaced by a "micro-sequence" comprising various other instructions.

Another type of instruction set executed by the JSM 102 may include instructions other than standard Java instructions. In accordance with at least some embodiments of the invention, the other instruction set may include register-based and memory-based operations to be performed. This other type of instruction set generally complements the Java instruction set and, accordingly, may be referred to as a complementary instruction set architecture ("C-ISA"). By complementary, it is meant that a complex Java Bytecode may be replaced by a "micro-sequence" comprising C-ISA instructions. The execution of Java may be made more efficient and run faster by replacing some sequences of Bytecodes by preferably shorter and more efficient sequences of C-ISA instructions. The two sets of instructions may be used in a complementary fashion to obtain satisfactory code density and efficiency. As such, the JSM 102 generally comprises a stack-based architecture for efficient and accelerated execution of Java Bytecodes combined with a register-based architecture for executing register and memory based C-ISA instructions. Both architectures preferably are tightly combined and integrated through the C-ISA. Because various of the data structures described herein are generally JVM-dependent and thus may change from one JVM implementation to another, the software flexibility of the micro-sequence provides a mechanism for various JVM optimizations now known or later developed.

Figure 2:
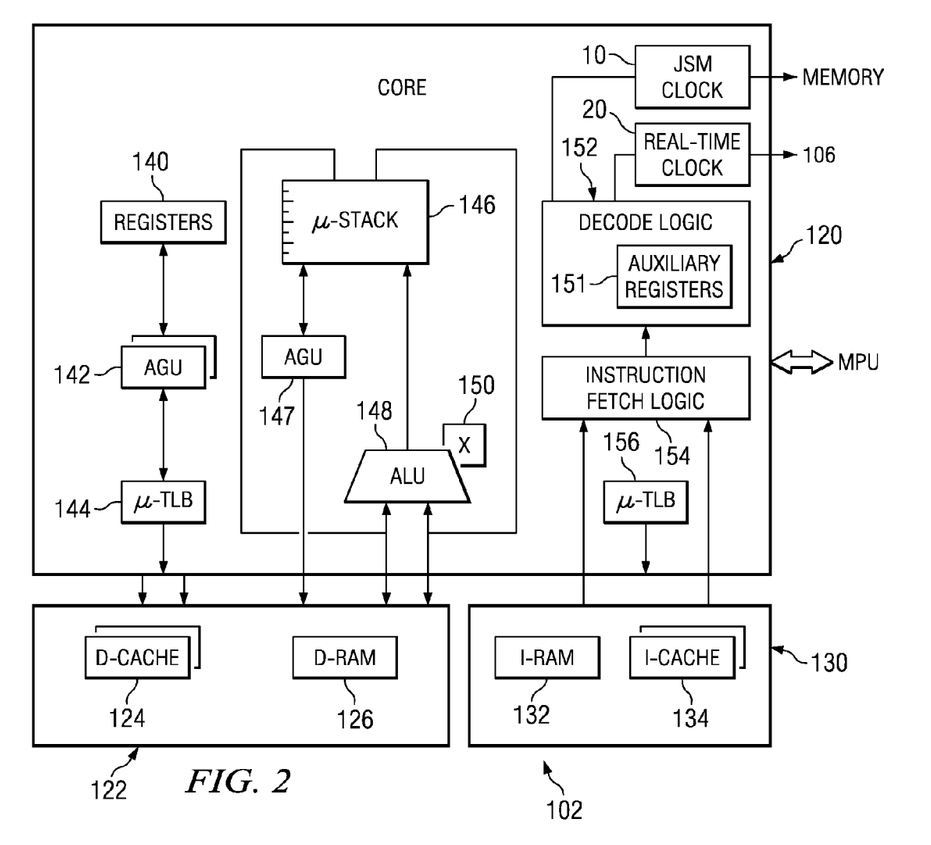

FIG. 2 shows an exemplary block diagram of the JSM 102. As shown, the JSM includes a core 120 coupled to data storage 122 and instruction storage 130. The core may include one or more components as shown. Such components preferably include a plurality of registers 140, three address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. In general, operands may be retrieved from data storage 122 or from the micro-stack 146 and processed by the ALU 148, while instructions may be fetched from instruction storage 130 by fetch logic 154 and decoded by decode logic 152. The address generation unit 142 may be used to calculate addresses based, at least in part, on data contained in the registers 140. The AGUs 142 may calculate addresses for C-ISA instructions. The AGUs 142 may support parallel data accesses for C-ISA instructions that perform array or other types of processing. The AGU 147 couples to the micro-stack 146 and may manage overflow and underflow conditions in the micro-stack preferably in parallel. The micro-TLBs 144, 156 generally perform the function of a cache for the address translation and memory protection information bits that are preferably under the control of the operating system running on the MPU 104. The decode logic 152 comprises auxiliary registers 151. The JSM 102 further comprises a JSM clock 10 and a real-time clock 20. Although the clocks 10, 20 are shown as coupled to the memory 106, the clocks 10, 20 may, in other embodiments, be coupled to other memories (e.g., D-RAM 126).

Figure 3:
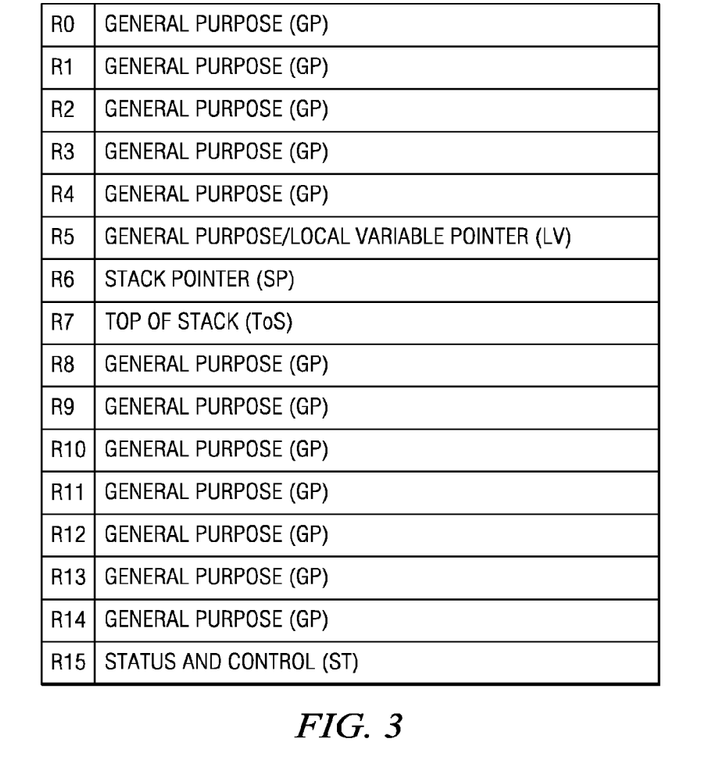

Referring now to FIG. 3, the registers 140 may include 16 registers designated as R0-R15. In some embodiments, registers R0-R5 and R8-R14 may be used as general purposes ("GP") registers usable for any purpose by the programmer. Other registers, and some of the GP registers, may be used for specific functions. For example, in addition to use as a GP register, register R5 may be used to store the base address of a portion of memory in which Java local variables may be stored when used by the current Java method. The top of the micro-stack 146 can be referenced by the values in registers R6 and R7. The top of the micro-stack 146 has a matching address in external memory pointed to by register R6. The values contained in the micro-stack 146 are the latest updated values, while their corresponding values in external memory may or may not be up to date. Register R7 provides the data value stored at the top of the micro-stack 146. Register R15 may be used for status and control of the JSM 102. At least one bit (called the "Micro-Sequence-Active" bit) in status register R15 is used to indicate whether the JSM 102 is executing a simple instruction or a complex instruction through a micro-sequence. This bit controls, in particular, which program counter is used (PC or μPC) to fetch the next instruction, as will be explained below.

Referring again to FIG. 2, as noted above, the JSM 102 is adapted to process and execute instructions from at least two instruction sets, at least one having instructions from a stack-based instruction set (e.g., Java). The stack-based instruction set may include Java Bytecodes. Unless empty, Java Bytecodes may pop data from and push data onto the micro-stack 146. The micro-stack 146 preferably comprises the top n entries of a larger stack that is implemented in data storage 122. Although the value of n may vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is generally very fast, although any particular access speed is not a limitation on this disclosure.

The ALU 148 adds, subtracts, and shifts data. The multiplier 150 may be used to multiply two values together in one or more cycles. The instruction fetch logic 154 generally fetches instructions from instruction storage 130. The instructions may be decoded by decode logic 152. Because the JSM 102 is adapted to process instructions from at least two instruction sets, the decode logic 152 generally comprises at least two modes of operation, one mode for each instruction set. As such, the decode logic unit 152 may include a Java mode in which Java instructions may be decoded and a C-ISA mode in which C-ISA instructions may be decoded.

The data storage 122 generally comprises data cache ("D-cache") 124 and data random access memory ("DRAM") 126. Reference may be made to U.S. Pat. No. 6,826,652, filed Jun. 9, 2000 and U.S. Pat. No. 6,792,508, filed Jun. 9, 2000, both incorporated herein by reference. Reference also may be made to U.S. Ser. No. 09/932,794 (Publication No. 20020069332), filed Aug. 17, 2001 and incorporated herein by reference. The stack (excluding the micro-stack 146), arrays and non-critical data may be stored in the D-cache 124, while Java local variables, critical data and non-Java variables (e.g., C, C++) may be stored in D-RAM 126. The instruction storage 130 may comprise instruction RAM ("I-RAM") 132 and instruction cache ("I-cache") 134. The I-RAM 132 may be used for "complex" micro-sequenced Bytecodes or micro-sequences, as will be described below. The I-cache 134 may be used to store other types of Java Bytecode and mixed Java/C-ISA instructions.

As noted above, the C-ISA instructions generally complement the standard Java Bytecodes. For example, the compiler 110 may scan a series of Java Bytecodes 112 and replace a complex Bytecode with a micro-sequence as explained previously. The micro-sequence may be created to optimize the function(s) performed by the replaced complex Bytecodes.

Figure 4:
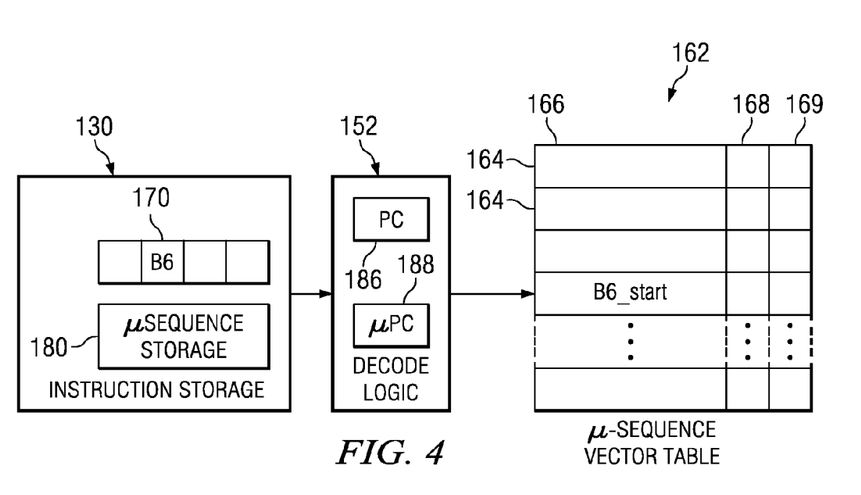

FIG. 4 illustrates the operation of the JSM 102 to replace Java Bytecodes with micro-sequences. FIG. 4 shows some, but not necessarily all, components of the JSM. In particular, the instruction storage 130, the decode logic 152, and a micro-sequence vector table 162 are shown. The decode logic 152 accesses the instruction storage 130 and the micro-sequence vector table 162. In general and as described above, the decode logic 152 receives instructions (e.g., instructions 170) from instruction storage 130 via instruction fetch logic 154 (FIG. 2) and decodes the instructions to determine the type of instruction for subsequent processing and execution. In accordance with the preferred embodiments, the JSM 102 either executes the Bytecode from instructions 170 or replaces a Bytecode from instructions 170 with a micro-sequence as described below. An advantage to replacing the Bytecode with the micro-sequence in this manner is that the micro-sequence preferably performs the same function with greater efficiency than the Bytecode, thus saving time and power.

The micro-sequence vector table 162 may be implemented in the decode logic 152 or as separate logic in the JSM 102. The micro-sequence vector table 162 preferably includes a plurality of entries 164. The entries 164 may include one entry for each Bytecode that the JSM may receive. For example, if there are a total of 256 Bytecodes, the micro-sequence vector table 162 preferably comprises at least 256 entries. Each entry 164 preferably includes at least three fields—a field 166, an associated field 168 and an associated field 169. Field 168 may comprise a single bit that indicates whether the instruction 170 is to be directly executed or whether the associated field 166 contains a reference to a micro-sequence. For example, a bit 168 having a value of "0" ("not set") may indicate the field 166 is invalid and thus, the corresponding Bytecode from instructions 170 is directly executable by the JSM. Bit 168 having a value of "1" ("set") may indicate that the associated field 166 contains a reference to a micro-sequence. Field 169 may comprise a single bit that indicates whether the instruction 170 is to be executed after a corresponding micro-sequence is executed. A bit 169 having a value of "0" may indicate that the instruction 170 is not to be executed after the micro-sequence is executed. A bit 169 having a value of "1" may indicate that the corresponding Bytecode is to be executed after the micro-sequence is executed.

If the bit 168 indicates the associated field 166 includes a reference to a micro-sequence, the reference may comprise the full starting address in instruction storage 130 of the micro-sequence or a part of the starting address that can be concatenated with a base address that may be programmable in the JSM. In the former case, field 166 may provide as many address bits as are required to access the full memory space. In the latter case, a register within the JSM registers 140 is programmed to hold the base address and the vector table 162 may supply only the offset to access the start of the micro-sequence. Most or all JSM internal registers 140 and any other registers preferably are accessible by the main processor unit 104 and, therefore, may be modified by the JVM as necessary. Although not required, this latter addressing technique may be preferred to reduce the number of bits needed within field 166. At least a portion 180 of the instruction 130 may be allocated for storage of micro-sequences and thus the starting address may point to a location in micro-sequence storage 130 at which a particular micro-sequence can be found. The portion 180 may be implemented in I-RAM 132 shown above in FIG. 2.

Although the micro-sequence vector table 162 may be loaded and modified in accordance with a variety of techniques, the following discussion includes a preferred technique. The vector table 162 preferably comprises a JSM resource that is addressable via a register 140. A single entry 164 or a block of entries within the vector table 162 may be loaded by information from the data cache 124 (FIG. 2). When loading multiple entries (e.g., all of the entries 164) in the table 162, a repeat loop of instructions may be executed. Prior to executing the repeat loop, a register (e.g., R0) preferably is loaded with the starting address of the block of memory containing the data to load into the table. Another register (e.g., R1) preferably is loaded with the size of the block to load into the table. Register R14 is loaded with the value that corresponds to the first entry in the vector table that is to be updated/loaded.

The repeated instruction loop preferably comprises two instructions that are repeated n times. The value n preferably is the value stored in register R1. The first instruction in the loop preferably performs a load from the start address of the block (R0) to the first entry in the vector table 162. The second instruction in the loop preferably adds an "immediate" value to the block start address. The immediate value may be "2" if each entry in the vector table is 16 bits wide. The loop repeats itself to load the desired portions of the total depending on the starting address.

In operation, the decode logic 152 progresses through a series of Bytecodes from instructions 170 (e.g., in a software program). The decode logic 152 uses each Bytecode from instructions 170 as an index into micro-sequence vector table 162. Once the decode logic 152 locates the indexed entry 164, the decode logic 152 examines the associated bit 168 to determine whether the Bytecode is to be replaced by a micro-sequence. The decode logic 152 also examines the associated bit 169 to determine whether the Bytecode is to be executed after the corresponding micro-sequence is executed. If the bit 168 indicates that the Bytecode can be directly processed and executed by the JSM, then the instruction is so executed. If, however, the bit 168 indicates that the Bytecode is to be replaced by a micro-sequence, then the decode logic 152 preferably changes this instruction into a "no operation" (NOP) and sets the micro-sequence-active bit (described above) in the status register R15. In another embodiment, the JSM's pipe may be stalled to fetch and replace this micro-sequenced instruction by the first instruction of the micro-sequence. Changing the micro-sequenced Bytecode into a NOP while fetching the first instruction of the micro-sequence permits the JSM to process multi-cycle instructions that are further advanced in the pipe without additional latency. The micro-sequence-active bit may be set at any suitable time such as when the micro-sequence enters the JSM execution stage (not specifically shown).

As described above, the JSM 102 implements two program counters—the PC and the micro-program counter (μPC). The PC and the μPC are stored in auxiliary registers 151, which in turn is stored in the decode logic 152. In accordance with a preferred embodiment, one of these two program counters is the active program counter used to fetch and decode instructions. The PC 186 is used when executing Bytecodes while the μPC is used when executing C-ISA instructions in a micro-sequence. The PC 186 may be the currently active program counter when the decode logic 152 encounters a Bytecode to be replaced by a micro-sequence. Setting the status register's micro-sequence-active bit causes the μPC 188 to become the active program counter instead of the program counter 186. Also, the contents of the field 166 associated with the micro-sequenced Bytecode preferably are loaded into the μPC 188.

At this point, the JSM 102 is ready to begin fetching and decoding the instruction(s) comprising the micro-sequence. In at least some embodiments, the micro-sequence-active bit within the status register R15 may only be changed when the first instruction of the micro-sequence enters the execute phase of JSM 102 pipe. The switch from the PC 186 to the μPC 188 preferably is effective immediately after the micro-sequenced instruction is decoded, thereby reducing the latency.

The micro-sequence may end with a predetermined value from the C-ISA called "RtuS" (return from micro-sequence) that indicates the end of the sequence. This C-ISA value causes a switch from the μPC to the PC upon completion of the micro-sequence. Preferably, the PC 186 previously was incremented upon transitioning to the micro-sequence, so that the value of the PC 186 points to the next instruction to be decoded.

Assuming that the bit 168 is set (e.g., is a "1" bit), the execution of the Bytecode is to be replaced with the execution of a micro-sequence. However, depending on the status of the bit 169, the Bytecode may or may not be executed after the micro-sequence is executed. In at least some embodiments, if the bit 169 is not set (e.g., is a "0" bit), then the replacement micro-sequence may be executed (i.e., in C-ISA mode) in place of the Bytecode. In some embodiments, the replacement micro-sequence may perform a function substantially similar to that of the Bytecode, thus effectively replacing the Bytecode. In other embodiments, the replacement micro-sequence may perform some other task. The scope of disclosure is not limited to executing a replacement micro-sequence that performs any particular function. In either case, the Bytecode is not executed after the micro-sequence is executed. Instead, at or about the time the decode logic 152 begins using the μPC 188 (i.e., processing the micro-sequence), the PC 186 preferably is incremented by a suitable value to point the PC to the next instruction following the Bytecode whose execution is replaced by the replacement micro-sequence.

However, if the bit 169 is set (e.g., is a "1" bit), then the Bytecode replaced by the micro-sequence is executed after the micro-sequence is executed. For a given Bytecode, a bit 169 is typically set when the corresponding micro-sequence is used to instrument the Bytecode, but it is desirable to execute the Bytecode as well. Such a technique may be used for any of a variety of applications, such as hotspot identification (discussed below), application monitoring, debugger support, dynamic code analysis, etc. When the bit 169 is set, the replacement micro-sequence is performed in lieu of the corresponding Bytecode, just as is done when the bit 169 is not set. However, when the bit 169 is set and after the replacement micro-sequence has been executed, the function of the Bytecode still needs to be fulfilled. Accordingly, when the bit 169 is set, the decode logic 152 processes the replacement micro-sequence in C-ISA mode, and subsequently decodes and executes the Bytecode in JSM mode. In this way, when the bit 169 corresponding to a particular Bytecode is set, a micro-sequence instrument corresponding to the Bytecode, as well as the Bytecode itself, are executed.

As mentioned above, when both the bits 168, 169 are set, the micro-sequence is executed in lieu of the corresponding Bytecode and, because the PC 186 is not incremented, the Bytecode itself also is executed. One possible problem that may arise in this situation is that upon processing the corresponding Bytecode after executing the micro-sequence, the decode logic 152 may determine that the bits 168, 169 are still both set. For this reason, the decode logic 152 would undesirably begin to re-execute the micro-sequence. In such a situation, the decode logic 152 effectively is stuck in an infinite loop that comprises repeatedly executing both the micro-sequence for the same Bytecode, as well as the Bytecode itself. To avoid such a problem, before determining the values of the bits 168, 169, the decode logic 152 preferably determines the status of a flag bit.(e.g., in a register 140). As previously discussed, the flag bit is set after executing the replacement micro-sequence. Because the flag bit is set, the decode logic 152 "realizes" that the replacement micro-sequence has already been executed, and thus the decode logic 152 proceeds to process the corresponding Bytecode in JSM mode. Immediately before or after the Bytecode is executed, the status of the flag bit is reset (i.e., returned to "not set"), so that the next Bytecode encountered may be appropriately processed. The PC 186 also is incremented and, in some embodiments, the μPC 188 may be reset.

Figure 5:
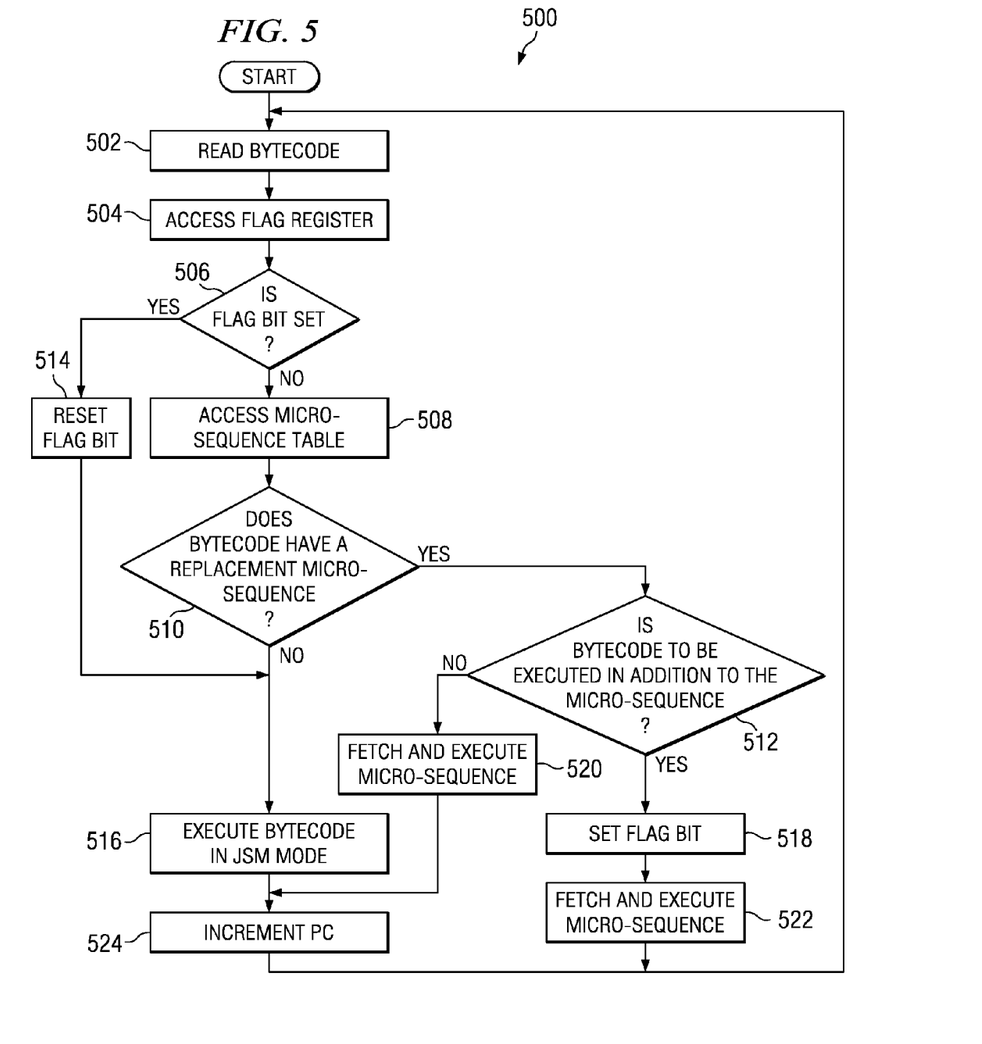

FIG. 5 shows a flowchart of a process 500 that may be used to implement the technique described above. As instructions 170 of a software program are processed, the decode logic 152 encounters a series of Bytecodes. The process 500 comprises reading each bytecode (block 502) and accessing the flag bit (e.g., in a register 140) described above (block 504) to determine whether a replacement micro-sequence for the current Bytecode already has been processed. If the flag bit is set (block 506), indicating that the replacement micro-sequence already has been processed, then the process 500 comprises resetting the flag bit (block 514), executing the current Bytecode in JSM mode (block 516), incrementing the PC 186 (block 524), and then reading the next Bytecode in the instructions 170 (block 502).

However, if the flag bit is not set (block 506), then the process 500 comprises accessing the micro-sequence table 162 (block 508) to determine whether the current Bytecode has a replacement micro-sequence (block 510), that is, to determine whether the status of bit 168 of the entry 164 corresponding to the current Bytecode is set. If the bit 168 is not set, meaning that the current Bytecode has no replacement micro-sequence, then the process 500 comprises executing the Bytecode in JSM mode (block 516), incrementing the PC 186 (block 524) and reading the next Bytecode from the instructions 170 (block 502).

However, if the bit 168 is set (block 510), meaning that the current Bytecode has a replacement micro-sequence, then the process 500 comprises determining whether the current Bytecode is to be executed in addition to its replacement micro-sequence (block 512), that is, determining whether the status of the bit 169 in the corresponding entry 164 is set. If the bit 169 is not set, meaning that the Bytecode is not to be executed in addition to its replacement micro-sequence, then the process 500 comprises fetching and executing that micro-sequence (block 520), incrementing the PC 186 (block 524), and subsequently reading the next Bytecode (block 502). In some embodiments, the PC 186 may not be incremented in block 524. For instance, the PC 186 may be set during execution of the micro-sequence (block 520) and in such a case the PC 186 would not be incremented in block 524.

Conversely, if the bit 169 is set (block 512), meaning that the current Bytecode is to be executed in addition to its replacement micro-sequence, then the process 500 comprises setting the flag bit (block 518), fetching and executing the replacement micro-sequence (block 522) and, without incrementing the PC 186, re-reading the current Bytecode for execution (block 502). The scope of disclosure is not limited to performing the steps of the process 500 in the order shown. Instead, the steps of the process 500 may be performed in any suitable order. For example, the flag bit may be reset (block 514) before executing the Bytecode (block 516) or after executing the Bytecode. Similarly, in some embodiments, the flag bit may be set (block 518) before executing the micro-sequence (block 522) or after executing the micro-sequence. Further, it is understood that a "replacement" micro-sequence is simply a micro-sequence that is executed in lieu of a Bytecode at least once. There is no inherent implication that the Bytecode is necessarily replaced by the replacement micro-sequence each time the Bytecode is encountered.

As mentioned above, the technique discussed in FIG. 5 may be used to instrument a Bytecode with a micro-sequence that performs a particular task, one of which comprises hotspot identification. Portions of software code that are frequently executed (e.g., by way of a loop) are termed "hotspots." Hotspots may be individual instructions or, in some cases, groups of instructions. Because hotspots are frequently executed, it is desirable to manipulate the hotspots to enable a processor to execute the hotspots with increased efficiency.

Whether a particular portion of code is a hotspot generally depends on whether that portion of code is executed a predetermined number of times (i.e., whether the number of executions is greater than a predetermined threshold). If, during execution of a software program, a particular portion of code is executed a number of times that is greater than the predetermined threshold, that portion of code may be deemed a hotspot, and the hotspot may be subject to manipulation to improve efficiency.

When the above technique is employed for hotspot identification in software code, the micro-sequence that replaces the Bytecode does not perform a function similar to that of the Bytecode. Instead, if the bit 169 is set, then the micro-sequence that is executed in lieu of the Bytecode (hereinafter the "tally" micro-sequence) serves as a counter to tally the number of times the Bytecode is encountered when processing instructions 170. Immediately before or after the tally micro-sequence is executed, the flag bit is set, so that the corresponding Bytecode is executed. Immediately before or after the corresponding Bytecode is executed, the flag bit is reset, as previously described. By tallying the number of times the Bytecode is encountered during program execution, it can be determined whether the Bytecode qualifies as a hotspot. The micro-sequence may comprise, for example, an instruction that increments or decrements a general "tally" register (e.g., register R12) that is used to tally the number of times the Bytecode is encountered. The PC 186 is not incremented.

A predetermined threshold may be used to determine whether a Bytecode qualifies as a hotspot. For example, the threshold may be set at 10,000 encounters. In this case, a Bytecode that has been encountered (i.e., tallied) at least 10,000 times while processing instructions 170 qualifies as a hotspot. In this example, a Bytecode that has not been encountered at least 10,000 times does not qualify as a hotspot. In a preferred embodiment, the aforementioned tally register may be set with the predetermined value. Thus, continuing with the previous example, the tally register (e.g., register R12) may be initialized to 10,000, and each time the Bytecode is encountered, the tally register may be decremented by 1. If the Bytecode is encountered at least 10,000 times, then the tally register is decremented to 0, and the Bytecode qualifies as a hotspot. Otherwise, the Bytecode does not qualify as a hotspot. The micro-sequence used to tally Bytecode encounters also may perform additional tasks as desired.

In a preferred embodiment, the bits 168, 169 of each Bytecode in the instructions 170 are both initialized to "set," so that each Bytecode is analyzed to determine whether that Bytecode is a hotspot, and so that a potential hotspot Bytecode is not overlooked. The bits 168, 169 preferably are initialized by one or more instructions from instructions 170.

Because a hotspot is executed numerous times during program execution, it is advantageous to optimize the software code comprising the hotspot. The software code may be optimized in any of a variety of ways, and the scope of disclosure is not limited to optimizing the software code in any particular manner. In some embodiments, a software program may comprise a code optimizer that identifies hotspot Bytecodes by checking tally registers that correspond to the Bytecodes. If a tally register indicates that a corresponding Bytecode has been encountered a number of times that exceeds the predetermined threshold described above, then that Bytecode qualifies as a hotspot, and the code optimizer may be executed on the hotspot to determine how the hotspot may be optimized or at least be made more efficient. In still other embodiments, a human software programmer may analyze an identified hotspot to determine a suitable manner in which to optimize or improve the efficiency of the hotspot. One or both of the bits 168, 169 may be modified (e.g., by an instruction in the instructions 170) once a corresponding Bytecode is identified as a hotspot. For example, once a Bytecode has been identified as a hotspot, it may no longer be necessary to continue tallying each time the Bytecode is encountered during program execution. In this case, modifying bit 168 causes the Bytecode to be executed directly in JSM mode during subsequent encounters with the Bytecode.

Portions of software code that would most benefit from compilation and/or optimization also may be identified using variations of the technique described above. For instance, the above technique may be modified to determine, for a particular portion of a software application being analyzed, the average number of clock cycles spent per instruction in the portion of code (i.e., the instructions per opcode (CPO)). The CPO of multiple portions of code may be compared to determine which portions of code may benefit from compilation and/or optimization. Alternatively, the processing time of a portion of code that is being analyzed may be timed to determine the amount of time that is necessary to process that portion of code. This time then may be divided by the number of instructions present in the portion of code, thus determining the average time per instruction in the portion of code. The average time per instruction in the code for multiple portions of code may be compared to determine which portion(s) of code would benefit from compilation and/or optimization.

In another embodiment, the technique may be modified to determine the memory bandwidth for a particular portion of code being analyzed. Specifically, the number of memory accesses performed by instructions in a portion of code may be divided by the total number of instructions in the portion, thus resulting in the memory bandwidth of the portion of code. The bandwidths of multiple portions of code may be compared to determine which portion(s) of code may benefit from compilation and/or optimization.

In yet another embodiment, the technique may be modified to determine the efficiency of the data cache architecture by determining the number of cycles that elapse during data access divided by the number of data access instructions. Portions of code that would most benefit from compilation and/or optimization may be identified using any of these embodiments, each of which is now discussed in turn.

To determine the CPO of a portion of code, a first counter (not shown) located in an input/output (I/O) space of memory is incremented by the JSM clock 10 each time a clock cycle elapses during processing of the portion of code. The JSM clock 10 is coupled to the memory and directly increments the first counter. Once the portion of code has been processed, the total number of elapsed clock cycles is divided by the total number of instructions (i.e., opcodes) present in the portion of code, resulting in the CPO of the portion of code. The I/O space may be accessed using dedicated load/store instructions (e.g., as used with the JSM 102) or using load/store instructions that also access DRAM 106. In the former case, peripheral devices mapped on I/O space are connected to the JSM 102 via a separate bus and are accessed using this bus. In the latter case, system memory and peripherals are accessed through a single bus. The counters described below monitor a variety of events and may be mapped using either of the above techniques, depending on system requirements and processor addressing capability. In the following example, counters are mapped within the I/O space and are read, updated, enabled and/or disabled using I/O instructions.

I/O instructions may be implemented at the application level in any of a variety of ways. For example, I/O instructions may be inserted directly into software code by, for example, a programmer. Using such I/O instructions, the first counter is reset and then initialized before a portion of code that is to be analyzed is processed. After the portion of code has been processed, the counter is stopped. A sequence of software code comprising the portion of code to be analyzed may appear as

```
Bytecode #1
Bytecode #2
ALT WI/O @clock_counter, value 0
ALT WI/O @enable_counter, value 1
Bytecode #3
.
.
.
Bytecode #n
ALT WI/O @enable_counter, value 0.
```

In the above sequence of code, Bytecodes #3 . . . #n comprise the portion of code that is to be analyzed. Thus, before Bytecode #3 is processed, the I/O instruction ALT WI/O @clock_counter, value 0 is used to clear the first counter, where "ALT WI/O" specifies the location of the first counter in the I/O memory, "@clock_counter" refers to the first counter, and value 0 clears the first counter. The I/O instruction ALT WI/O @enable_counter, value 1 is used to activate the first counter, where "@enable_counter" specifies that "value 1" is to be written to the first counter in order to activate the first counter. Once the first counter is activated and Bytecodes #3 . . . #n are being processed, the first counter is incremented by the JSM clock 10 by one each time that a clock cycle elapses. Thus, for instance, if 50 clock cycles from the JSM clock 10 elapse while Bytecodes #3 . . . #n are processed, the first counter is incremented to 50. As soon as the last Bytecode in the portion of code to be analyzed (i.e., Bytecode #n) is executed, the I/O instruction ALT WI/O @enable_counter, value 0 is executed, where "@enable_counter" specifies that "value 0" is to be written to the first counter in order to deactivate the first counter. This instruction deactivates the first counter and prevents the first counter from being incremented any further. Additional code may be inserted to read the first counter and to divide the value of the first counter by the total number of instructions present in the portion of code to be analyzed. For example, if the first counter reads "50" after the Bytecodes #3 . . . #n are executed, then 50 is divided by the total number of instructions present in Bytecodes #3 . . . #n. For the purpose of explanation, assume that there are 25 instructions present in Bytecodes #3 . . . #n. Accordingly, the value of the counter (i.e., 50) is divided by the number of instructions in the portion of code to be analyzed (i.e., 25) to determine the cycles per opcode (CPO) which, in this example, is 2.

The I/O instructions also may be implemented at the application level via the use of a micro-sequence. Specifically, in the sequence of software code

```
Bytecode #1
Bytecode #2
Bytecode #3
.
.
.
Bytecode #n
Bytecode #n+1
.
.
.,
```

Bytecodes #3 . . . #n comprise the portion of code that is to be analyzed. Bytecode #2 may correspond to a micro-sequence in the micro-sequence vector table 162. When retrieved and executed, the corresponding micro-sequence may not only perform the function of the Bytecode #2, but it also may control the monitoring counter via the use of I/O instructions. For example, the micro-sequence may first perform the function of Bytecode #2, then may clear the first counter using the instruction ALT WI/O @clock_counter, value 0 and then may activate the first counter using the instruction

ALT WI/O @enable_counter, value 1.

After the Bytecodes #3 . . . #n have been executed, a Bytecode #n+1 immediately following Bytecode #n may correspond to a different micro-sequence in the micro-sequence vector table 162 that not only performs the function of the Bytecode #n+1, but also deactivates the first counter using the instruction ALT WI/O @enable_counter, value 0.

The first counter then may be read and analyzed, as described above, to determine the CPO.

Yet another way that the I/O instructions may be implemented at the application level comprises the use of the bit 169 in the micro-sequence vector table 162, in a manner similar to that previously described. Specifically, in the sequence of software code

```
Bytecode #1
Bytecode #2
Bytecode #3
.
.
.
Bytecode #n
Bytecode #n+1
.
.
.,
```

Bytecodes #3 . . . #n comprise the portion of code that is to be analyzed. The Bytecode #3 may correspond to an entry in the vector table 162. The field 166 of the entry comprises the address of a micro-sequence that is to be executed in lieu of the Bytecode #3. However, the bits 168, 169 preferably are set, so that the micro-sequence is executed first, and then the Bytecode #3 is executed. Thus, assuming bits 168, 169 are set, the decode logic 152 first processes the micro-sequence, which micro-sequence uses the instructions

```
ALT WI/O @clock_counter, value 0
ALT WI/O @enable_counter, value 1
``` to clear the first counter and to activate the first counter, respectively. Because the bit 169 is set, the decode logic 152 will process the Bytecode #3 after processing the micro-sequence. After processing Bytecode #3, the decode logic 152 will process Bytecodes #4 . . . #n. Bytecode #n+1 preferably corresponds to an entry in the vector table 162 comprising bits 168, 169 that are set, and further comprising the address of a different micro-sequence. As such, the decode logic 152 first executes the micro-sequence, which micro-sequence uses the instruction ALT WI/O @enable_counter, value 0 to deactivate the first counter. Because bit 169 is set, the decode logic 152 then processes Bytecode #n+1 and subsequently continues processing the remainder of the sequence of software code. The first counter may be accessed to determine the CPO as previously described.

Regardless of how the I/O instructions are implemented at the application level, once the portion of code that is to be analyzed has been processed, the value of the first counter is read and manipulated to determine the CPO. Once the CPO of the portion of code is determined, it can be compared against the CPO values of other portions of code in order to determine which portion(s) of code would benefit most from compilation and/or optimization.

To determine the average amount of time spent executing each instruction in a portion of code, a second counter in the I/O space of memory is incremented by the real-time clock 20 with each tick of the clock 20 that occurs during execution of the portion of code. Once the portion of code has been processed, the total time elapsed during processing of the portion of code is divided by the total number of instructions present in the portion of code. This calculation produces the average time spent per instruction for each instruction in the portion of code.

I/O instructions are used to control the second counter in a manner similar to that used to control the first counter. Specifically, in some embodiments, I/O instructions may be inserted directly into software code. These I/O instructions may be used to clear the second counter and activate the second counter before the portion of code to be analyzed is executed. After the portion of code is executed, an additional I/O instruction may be used to deactivate the counter. For example, in the code sequence

```
Bytecode #1
Bytecode #2
ALT WI/O @clock_counter2, value 0
ALT WI/O @enable_counter2, value 1
Bytecode #3
.
.
.
```

-continued

```
Bytecode #n
ALT WI/O @enable_counter2, value 0,
``` the Bytecodes #3 . . . #n comprise the portion of code that is to be analyzed. Accordingly, the instruction ALT WI/O @clock_counter2, value 0 is used to clear the second counter, and the instruction

ALT WI/O @enable_counter2, value 1 is used to activate the second counter. Once the second counter is activated, the Bytecodes #3 . . . #n are processed. While the Bytecodes #3 . . . #n are being processed, the second counter is incremented with each pulse of the real-time clock 20. The real-time clock 20 may pulse on each second, millisecond, microsecond, nanosecond, or any other adjustable, suitable unit of time. Once the Bytecodes #3 . . . #n have been processed, the instruction ALT WI/O @enable_counter2, value 0 is used to deactivate the second counter. The value in the second counter then may be read to determine the total amount of time used to complete the portion of code to be analyzed (i.e., Bytecodes #3 . . . #n). This total amount of time may be divided by the number of instructions in Bytecodes #3 . . . #n, thus resulting in the average amount of time spent per instruction. This average amount may be compared to the average amount of time spent per instruction in other portions of code in order to determine the portion(s) of code that would most benefit from code compilation and/or optimization.

Alternatively, in other embodiments, the I/O instructions may be implemented at the application level using a micro-sequence, in a manner similar to that described above. In general, for a sequence of software code

```
Bytecode #1
Bytecode #2
Bytecode #3
  .
  .
  .
Bytecode #n
Bytecode #n+1
  .
  .
  .,
``` where the portion of code to be analyzed comprises Bytecodes #3 . . . #n, a micro-sequence corresponding to Bytecode #2 may be found in the micro-sequence vector table 162. This micro-sequence preferably performs not only the function of the Bytecode #2, but it also clears the second counter and activates the second counter using the I/O instructions

```
ALT WI/O @clock_counter2, value 0
ALT WI/O @enable_counter2, value 1
``` respectively. Once Bytecodes #3 . . . #n have been processed, the Bytecode #n+1 is replaced with a different micro-sequence. This micro-sequence, in addition to performing the function of Bytecode #n+1, may use the I/O instruction ALT WI/O @enable_counter2, value 0 or some similar instruction to deactivate the second counter. Once the second counter has been deactivated, the value of the second counter may be used to determine the average amount of time spent executing each instruction in the portion of code to be analyzed, as described above.

In yet other embodiments, the I/O instructions may be implemented at the application level using bit 169 of the vector table 162 described above. For a sequence of software code

```
Bytecode #1
Bytecode #2
Bytecode #3
  .
  .
  .
Bytecode #n
Bytecode #n+1
  .
  .
  .,
``` the Bytecode #3 may correspond to an entry in the vector table 162, which entry comprises bits 168, 169 that have been set. Because bit 168 is set, the micro-sequence address indicated in the entry of table 162 is used to locate and execute the micro-sequence. When executed, this micro-sequence uses the I/O instructions

```
ALT WI/O @clock_counter2, value 0
ALT WI/O @enable_counter2, value 1
``` to clear and activate the second counter, respectively. Because bit 169 is set, the Bytecode #3 is executed after the micro-sequence is executed. After the second counter has been activated, the Bytecodes #3 . . . #n, which comprise the portion of code to be analyzed, are processed. After Bytecode #n has been processed, Bytecode #n+1 is processed, which Bytecode #n+1 corresponds to a different entry in the vector table 162. This entry comprises bits 168, 169 that have been set. Because bit 169 is set, the micro-sequence address indicated in the entry of table 162 is used to locate and execute the micro-sequence. When executed, this micro-sequence uses the I/O instruction ALT WI/O @enable_counter2, value 0 to deactivate the second counter. Once the second counter has been deactivated, the value of the second counter may be read and used to determine the average amount of time spent processing each instruction in Bytecodes #3 . . . #n, as described above.

Regardless of how the I/O instructions are implemented at the application level, once the portion of code that is to be analyzed has been processed, the value of the second counter is used to determine the average amount of time spent processing each instruction in the analyzed portion of code. Once this value is determined, it can be compared against those of other portions of code in order to determine which portion(s) of code would benefit most from compilation and/or optimization.

To determine the memory bandwidth for a portion of code, a third counter located in the I/O space of memory is incremented by the JSM clock 10 once for each memory data access that occurs while executing the portion of code. Once the portion of code has been executed, the total number of memory data accesses is divided by the total number of instructions in the portion of code, thus producing the memory bandwidth for that portion of code.

Like the first and second counters, the third counter also is located in the I/O space of memory and is controlled using I/O instructions. As previously discussed, in some embodiments, these I/O instructions may be implemented at the application level by direct insertion into the software code comprising the portion of code to be analyzed. For example, in the sequence of code

```
Bytecode #1
Bytecode #2
ALT WI/O @clock_counter3, value 0
ALT WI/O @enable_counter3, value 1
Bytecode #3
.
.
.
Bytecode #n
ALT WI/O @enable_counter3, value 0,
``` the Bytecodes #3 . . . #n comprise the portion of code that is to be analyzed. Accordingly, the instruction
 ALT WI/O @clock_counter3, value 0
is used to clear the third counter, and the instruction
 ALT WI/O @enable_counter3, value 1
is used to activate the third counter. Once the third counter is activated, the Bytecodes #3 . . . #n are processed. While the Bytecodes #3 . . . #n are being processed, the third counter is automatically and directly incremented by the JSM clock 10 each time the memory is accessed to obtain data. Once the Bytecodes #3 . . . #n have been processed, the instruction
 ALT WI/O @enable_counter3, value 0
is used to deactivate the third counter. The value in the third counter then may be read to determine the total number of memory accesses that occurred while processing Bytecodes #3 . . . #n. This total number of accesses may be divided by the number of instructions in Bytecodes #3 . . . #n, thus resulting in the memory bandwidth for that portion of code. This level of bandwidth may be compared to the bandwidths of other portions of code in order to determine the portion(s) of code that would most benefit from code compilation and/or optimization.

Alternatively, in other embodiments, the I/O instructions may be implemented at the application level using a micro-sequence, in a manner similar to that described above. In general, for a sequence of software code

```
Bytecode #1
Bytecode #2
Bytecode #3
.
.
.
Bytecode #n
Bytecode #n+1
.
.
.,
``` the portion of code to be analyzed comprises Bytecodes #3 . . . #n. A micro-sequence corresponding to Bytecode #2 may be found in the micro-sequence vector table 162. This micro-sequence performs not only the function of the Bytecode #2, but it also clears and activates the third counter using the I/O instructions

```
ALT WI/O @clock_counter3, value 0
ALT WI/O @enable_counter3, value 1
``` as described above. Once Bytecodes #3 . . . #n have been processed, the Bytecode #n+1 may be replaced with a corresponding micro-sequence. This micro-sequence, in addition to performing the function of Bytecode #n+1, may cause the third counter to be deactivated by using the I/O instruction
 ALT WI/O @enable_counter3, value 0
or some similar instruction. Once the third counter has been deactivated, the value of the third counter may be used to determine the memory bandwidth of the portion of code comprising Bytecodes #3 . . . #n, as described above.

In yet other embodiments, the I/O instructions may be implemented at the application level using bit 169 of the vector table 162 described above. For a sequence of software code

```
Bytecode #1
Bytecode #2
Bytecode #3
.
.
.
Bytecode #n
Bytecode #n+1
.
.
.,
``` the Bytecode #3 corresponds to an entry in the vector table 162, which entry comprises bits 168, 169 that have been set. Because bit 168 is set, the micro-sequence address indicated in the entry of table 162 is used to locate and execute the micro-sequence. When executed, this micro-sequence uses the I/O instructions

```
ALT WI/O @clock_counter3, value 0
ALT WI/O @enable_counter3, value 1
``` to clear and activate the third counter. Because bit 169 is set, Bytecode #3 is executed after the micro-sequence is executed. After the third counter has been activated, the Bytecodes #3 . . . #n, which comprise the portion of code to be analyzed, are processed. After Bytecode #n has been processed, Bytecode #n+1 is processed, which Bytecode #n+1 corresponds to another entry in the vector table 162. This entry comprises bits 168, 169 that have been set. Because bit 169 is set, the micro-sequence address indicated in the entry of table 162 is used to locate and execute the micro-sequence. When executed, this micro-sequence uses the I/O instruction
 ALT WI/O @enable_counter3, value 0
to deactivate the third counter. Once the third counter has been deactivated, the value of the third counter may be read and used to determine the average amount of time spent processing each instruction in Bytecodes #3 . . . #n. As described above, this information may be used to determine which of a plurality of portions of code may benefit most from code compilation and/or optimization.

To determine the efficiency of the data cache architecture while executing a portion of code, a fourth counter located in the I/O space of memory is incremented directly and automatically by the JSM clock 10 once for each clock cycle that elapses while data is being accessed from memory. Once the portion of code has been processed, the total number of clock cycles that were spent accessing data from memory is divided by the total number of data access instructions in the portion of code, thus producing an indicator as to the efficiency of the data cache architecture.

Like the first, second and third counters, the fourth counter also is located in the I/O space of memory and is controlled using I/O instructions. As previously discussed, these I/O instructions may be implemented at the application level by direct insertion into the software code comprising the portion of code to be analyzed. For example, in the sequence of code

```
Bytecode #1
Bytecode #2
ALT WI/O @clock_counter4, value 0
ALT WI/O @enable_counter4, value 1
Bytecode #3
.
.
.
Bytecode #n
ALT WI/O @enable_counter4, value 0,
``` the Bytecodes #3 . . . #n comprise the portion of code that is to be analyzed. Accordingly, the instruction ALT WI/O @clock_counter4, value 0 is used to clear the fourth counter, and the instruction

ALT WI/O @enable_counter4, value 1 is used to activate the fourth counter. Once the fourth counter is activated, the Bytecodes #3 . . . #n are processed. While the Bytecodes #3 . . . #n are being processed, the fourth counter is incremented by the JSM clock 10 each time the memory is accessed to obtain data. Once the Bytecodes #3 . . . #n have been processed, the instruction ALT WI/O @enable_counter4, value 0 is used to deactivate the fourth counter. The value in the fourth counter then may be read to determine the total number of clock cycles that were spent accessing data from memory. This total number of cycles may be divided by the number of instructions in Bytecodes #3 . . . #n, thus revealing the efficiency of the data cache architecture. This level of efficiency may be compared to the efficiency levels of other portions of code in order to determine the portion(s) of code that would most benefit from code compilation and/or optimization.

Alternatively, in other embodiments, the I/O instructions may be implemented at the application level using a micro-sequence, in a manner similar to that described above. In general, for a sequence of software code

```
Bytecode #1
Bytecode #2
Bytecode #3
```

-continued

```
.
.
.
Bytecode #n
Bytecode #n+1
.
.
.,
``` where the portion of code to be analyzed comprises Bytecodes #3 . . . #n, a micro-sequence corresponding to Bytecode #2 may be found in the micro-sequence vector table 162. This micro-sequence preferably performs not only the function of the Bytecode #2, but it also clears the fourth counter and activates the fourth counter using the I/O instructions

```
ALT WI/O @clock_counter4, value 0
ALT WI/O @enable_counter4, value 1
``` as described above. Each time a data access is made to memory, the fourth counter is incremented for each JSM 102 clock cycle that elapses while accessing the memory. The fourth counter is automatically incremented by the JSM 102 clock. Once the portion of code to be analyzed (i.e., Bytecodes #3 . . . #n) has been processed, the Bytecode #n+1 may be replaced with a corresponding micro-sequence. This micro-sequence may, in addition to performing the function of Bytecode #n+1, cause the fourth counter to be deactivated by using the I/O instruction ALT WI/O @enable_counter4, value 0 or some similar instruction. Once the fourth counter has been deactivated, the value of the fourth counter may be used to determine the efficiency level of the data cache architecture, as previously described.

In yet other embodiments, the I/O instructions may be implemented at the application level using bit 169 of the vector table 162 as described above. For a sequence of software code

```
Bytecode #1
Bytecode #2
Bytecode #3
.
.
.
Bytecode #n
Bytecode #n+1
.
.
.,
``` the Bytecode #3 may correspond to an entry in the vector table 162, which entry may comprise bits 168, 169 that have been set. Because bit 168 is set, the micro-sequence address indicated in the entry of table 162 is used to locate and execute the micro-sequence. When executed, this micro-sequence uses the I/O instructions

```
ALT WI/O @clock_counter4, value 0
ALT WI/O @enable_counter4, value 1
``` to clear and activate the fourth counter. Because bit 169 is set, the Bytecode #3 is executed after the micro-sequence is executed. After the fourth counter has been activated, the Bytecodes #3 . . . #n, which comprise the portion of code to be analyzed, are processed. Any time a data access to memory is made while this portion of code is being processed, the fourth counter is incremented for each pulse of the JSM clock 10 (i.e., each clock cycle). The JSM clock 10 automatically increments the fourth counter. After Bytecodes #3 . . . #n have been processed, Bytecode #n+1 is processed, which Bytecode #n+1 corresponds to another entry in the vector table 162. This entry may comprise bits 168, 169 that have been set. Because bit 168 is set, the micro-sequence address indicated in the entry of table 162 is used to locate and execute the micro-sequence. When executed, this micro-sequence uses the I/O instruction

```
ALT WI/O @enable_counter4, value 0
``` to deactivate the fourth counter. Also, because bit 169 is set, the Bytecode #n+1 is processed immediately after the corresponding micro-sequence is processed. Once the fourth counter has been deactivated, the value of the fourth counter may be read and used to determine the efficiency level of the data cache architecture. As described above, this information may be used to determine which of a plurality of portions of code may benefit most from code compilation and/or optimization. The description above uses a different counter for each different type of monitored event. However, in some embodiments, the same counter may be enabled and programmed to sequentially monitor different events.

Figure 6:
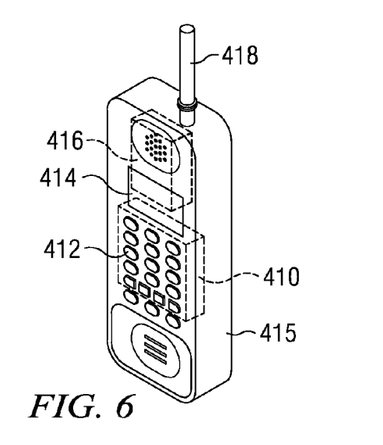

System 100 may be implemented as a mobile cell phone 415 such as that shown in FIG. 6. As shown, the battery-operated, mobile communication device includes an integrated keypad 412 and display 414. The JSM processor 102 and MPU processor 104 and other components may be included in electronics package 410 connected to the keypad 412, display 414, and radio frequency ("RF") circuitry 416. The RF circuitry 416 may be connected to an antenna 418.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

The invention claimed is:

1. A processor, comprising:
   fetch logic adapted to fetch a set of instructions from memory, the set comprising a subset of instructions;
   decode logic coupled to the fetch logic and adapted to process the set of instructions, wherein the decode logic comprises a vector table comprising an entry for each instruction in an instruction set of the processor, each entry in the vector table comprising a first bit that indicates whether or not a micro-sequence corresponding to the instruction is to be executed when the instruction is decoded, and a second bit that indicates whether or not the instruction is to be executed if the micro-sequence is executed; and
   a clock coupled to the decode logic;
   wherein when the decode logic processes an instruction from the set of instructions and when the first bit in the entry for the instruction indicates the micro-sequence is to be executed, the micro-sequence corresponding to the instruction is executed to enable a counter external to the processor, wherein enabling the counter causes the clock to increment the counter while the subset is processed,
   wherein a status of the counter is manipulated to determine an efficiency level pertaining to the subset of instructions.

2. The processor of claim 1, wherein the efficiency level is indicative of the efficiency with which the decode logic processes the subset of instructions.

3. The processor of claim 1, wherein the clock increments the counter with the passing of each clock cycle.

4. The processor of claim 1, wherein the clock increments the counter with the passing of a unit of time, wherein the unit of time is adjustable.

5. The processor of claim 1, wherein the clock increments the counter each time a memory is accessed to obtain data.

6. The processor of claim 1, wherein the clock increments the counter for each clock cycle that elapses while a memory is accessed to obtain data.

7. The processor of claim 1, wherein said efficiency level is determined by dividing the status of the counter by a number of instructions located in said subset.

8. The processor of claim 1, wherein said efficiency level is compared to that of another subset of instructions to determine which subset is to be compiled.

9. The processor of claim 1, wherein the counter is located in an input-output (I/O) memory space external to the processor.

10. The processor of claim 1, wherein after the subset of instructions is decoded, a micro-sequence corresponding to another instruction in the set of instructions is executed to disable the counter.

11. The processor of claim 1, wherein
    when the second bit in the entry for the instruction indicates that the instruction is not to be executed, the micro-sequence is executed in lieu of the instruction and also performs a function of the instruction, and
    when the second bit indicates that the instruction is to be executed, the instruction is executed after the micro-sequence is executed.

12. An electronic device, comprising:
    a decode logic adapted to process a set of instructions, wherein the decode logic comprises a vector table comprising an entry for each instruction in an instruction set, each entry in the vector table comprising a first field that indicates whether or not a micro-sequence corresponding to the instruction is to be executed when the instruction is decoded, and a second field that indicates whether or not the instruction is to be executed if the micro-sequence is executed;
    a clock coupled to the decode logic; and
    a memory coupled to the decode logic and comprising a counter;
    wherein the decode logic is further adapted to process an instruction, wherein the micro-sequence corresponding to the instruction is executed to enable the counter when the first field in the entry for the instruction indicates the micro-sequence is to be executed, wherein enabling the counter causes the clock to increment the counter with each clock pulse, the counter incremented only while the set of instructions is processed, wherein a status of the counter is manipulated to determine an efficiency level pertaining to the set of instructions.

13. The electronic device of claim 12, wherein the efficiency level is indicative of the efficiency with which the decode logic processes the set of instructions.

14. The electronic device of claim 12, wherein the device is at least one of a mobile communication device or a battery-operated device.

15. The electronic device of claim 12, wherein the counter is located in an input-output (I/O) space of the memory.

16. The electronic device of claim 12, wherein the decode logic is further adapted to process another instruction after the set of instructions is decoded, wherein a micro-sequence corresponding to the another instruction is executed to disable the counter.

17. The electronic device of claim 12, wherein when the second field in the entry for the instruction indicates that the instruction is not to be executed, the micro-sequence is executed in lieu of the instruction and also performs a function of the instruction, and when the second field indicates that the instruction is to be executed, the instruction is executed after the micro-sequence is executed.

18. The electronic device of claim 12, wherein the efficiency level is determined by dividing the status of the counter by the number of instructions in the set of instructions.

19. The electronic device of claim 12, wherein the clock increments the counter with the passing of a clock cycle.

20. The electronic device of claim 12, wherein the clock increments the counter such that the status of the counter reflects a length of time.

21. The electronic device of claim 12, wherein the clock increments the counter when the memory is accessed to obtain data.

22. The electronic device of claim 12, wherein the clock increments the counter when a clock cycle elapses while the memory is accessed to obtain data.

23. A method, comprising:

decoding an instruction, wherein a micro-sequence corresponding to the instruction is executed when a first field in an entry of a decoder vector table corresponding to the instruction indicates that the micro-sequence is to be executed, wherein the micro-sequence enables a counter external to a processor, wherein enabling the counter causes a processor clock to increment the counter while instructions are processed, and wherein when a second field in the entry indicates that the instruction is not be executed, the micro-sequence also performs a function of the instruction, and when the second field indicates that the instruction is to be executed, the instruction is executed after the micro-sequence is executed;

processing a first set of instructions, wherein the counter is incremented only while the first set of instructions is processed;

after the first set of instructions has been processed, manipulating a status of the counter to determine an efficiency level pertaining to the first set of instructions; and comparing said efficiency level to that of a second set of instructions to determine which of the first set or the second set is to be compiled.

24. The method of claim 23, wherein determining the efficiency level comprises determining the efficiency with which the first set of instructions is processed.

25. The method of claim 23, wherein causing the processor clock to increment the counter comprises incrementing the counter only when a clock cycle elapses.

26. The method of claim 23, wherein causing the processor clock to increment the counter comprises incrementing the counter only at regular intervals, said intervals selected from the group consisting of minutes, seconds, milliseconds, microseconds and nanoseconds.

27. The method of claim 23, wherein causing the processor clock to increment the counter comprises incrementing the counter only when a memory is accessed to obtain data.

28. The method of claim 23, wherein causing the processor clock to increment the counter comprises incrementing the counter only when a clock cycle elapses while a memory is accessed to obtain data.

29. The processor of claim 1, wherein the micro-sequence consists of instructions from a register-based instruction set of the processor and the set of instructions comprises instructions from a stack-based instruction set of the processor.

30. The electronic device of claim 12, wherein the micro-sequence consists of instructions from a register-based instruction set and the set of instructions comprises instructions from a stack-based instruction set.

* * * * *